(12) United States Patent
Mermoud et al.

(10) Patent No.: US 12,506,653 B2
(45) Date of Patent: Dec. 23, 2025

(54) LLM-BASED NETWORK TROUBLESHOOTING USING EXPERT-CURATED RECIPES

(71) Applicant: Cisco Technology, Inc., San Jose, CA (US)

(72) Inventors: Grégory Mermoud, Venthône (CH); Pierre-André Savalle, Rueil-Malmaison (FR); Jean-Philippe Vasseur, Combloux (FR); Eduard Schornig, Haarlem (NL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/386,837

(22) Filed: Nov. 3, 2023

(65) Prior Publication Data

US 2025/0150321 A1 May 8, 2025

(51) Int. Cl.
*G06F 15/173* (2006.01)
*H04L 41/0631* (2022.01)
*H04L 41/16* (2022.01)
*H04L 41/5009* (2022.01)

(52) U.S. Cl.
CPC .......... *H04L 41/0631* (2013.01); *H04L 41/16* (2013.01); *H04L 41/5009* (2013.01)

(58) Field of Classification Search
CPC .. H04L 41/0631; H04L 41/16; H04L 41/5009
USPC ....................................................... 709/224
See application file for complete search history.

(56) References Cited

U.S. PATENT DOCUMENTS

| | | | |
|---|---|---|---|
| 11,658,886 B2 * | 5/2023 | Rubens | H04L 41/5074 379/265.13 |
| 12,040,934 B1 * | 7/2024 | Wang | G06F 3/0482 |
| 2004/0044542 A1 | 3/2004 | Beniaminy et al. | |
| 2008/0016017 A1 * | 1/2008 | Biazetti | G06N 5/02 706/45 |
| 2020/0366548 A1 | 11/2020 | Deb et al. | |
| 2021/0406114 A1 * | 12/2021 | Chen | G06F 11/0709 |
| 2022/0036153 A1 * | 2/2022 | O'Malia | G06N 3/042 |
| 2022/0261817 A1 | 8/2022 | Ferrucci et al. | |
| 2023/0132033 A1 | 4/2023 | Gupta et al. | |
| 2023/0259821 A1 | 8/2023 | Travalini et al. | |
| 2024/0114362 A1 * | 4/2024 | Wang | H04W 24/04 |
| 2024/0202584 A1 * | 6/2024 | Schillace | G06N 20/00 |

OTHER PUBLICATIONS

Maatouk A., et al., "Large Language Models for Telecom: Forthcoming Impact on the Industry", arXiv:2308.06013v1 [cs.IT], Aug. 11, 2023, pp. 1-7.

* cited by examiner

*Primary Examiner* — Alan S Chou
(74) *Attorney, Agent, or Firm* — Lee & Hayes, P.C.

(57) ABSTRACT

In one implementation, a device receives an input request for a large language model-based network troubleshooting agent regarding an issue in a network. The large language model-based network troubleshooting agent performs a lookup of a recipe based on the input request, wherein the recipe comprises contextual information for the issue. The device generates, by the large language model-based network troubleshooting agent, a prompt for a large language model based on the input request and on the recipe. The device provides, by the large language model-based network troubleshooting agent, the prompt to the large language model to troubleshoot the issue in the network.

20 Claims, 11 Drawing Sheets

LLM-BASED NETWORK TROUBLESHOOTING USING EXPERT-CURATED RECIPES

TECHNICAL FIELD

The present disclosure relates generally to large language model (LLM)-based network troubleshooting using expert-curated recipes.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

Advanced prompting techniques such as few-shot prompting, which involves providing example prompts with questions and correct answers to help the model learn context and formulation simultaneously, and chain-of-thought (CoT) prompting, which guides models through intermediate logical steps, have been shown to enhance the performance of LLMs in multi-step tasks. However, they often fall short when dealing with complex network troubleshooting scenarios as, by themselves, they lack the ability to incorporate any specific domain or environment level knowledge or learnings based on previous experience into the decision-making process which is key to solving these types of tasks.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
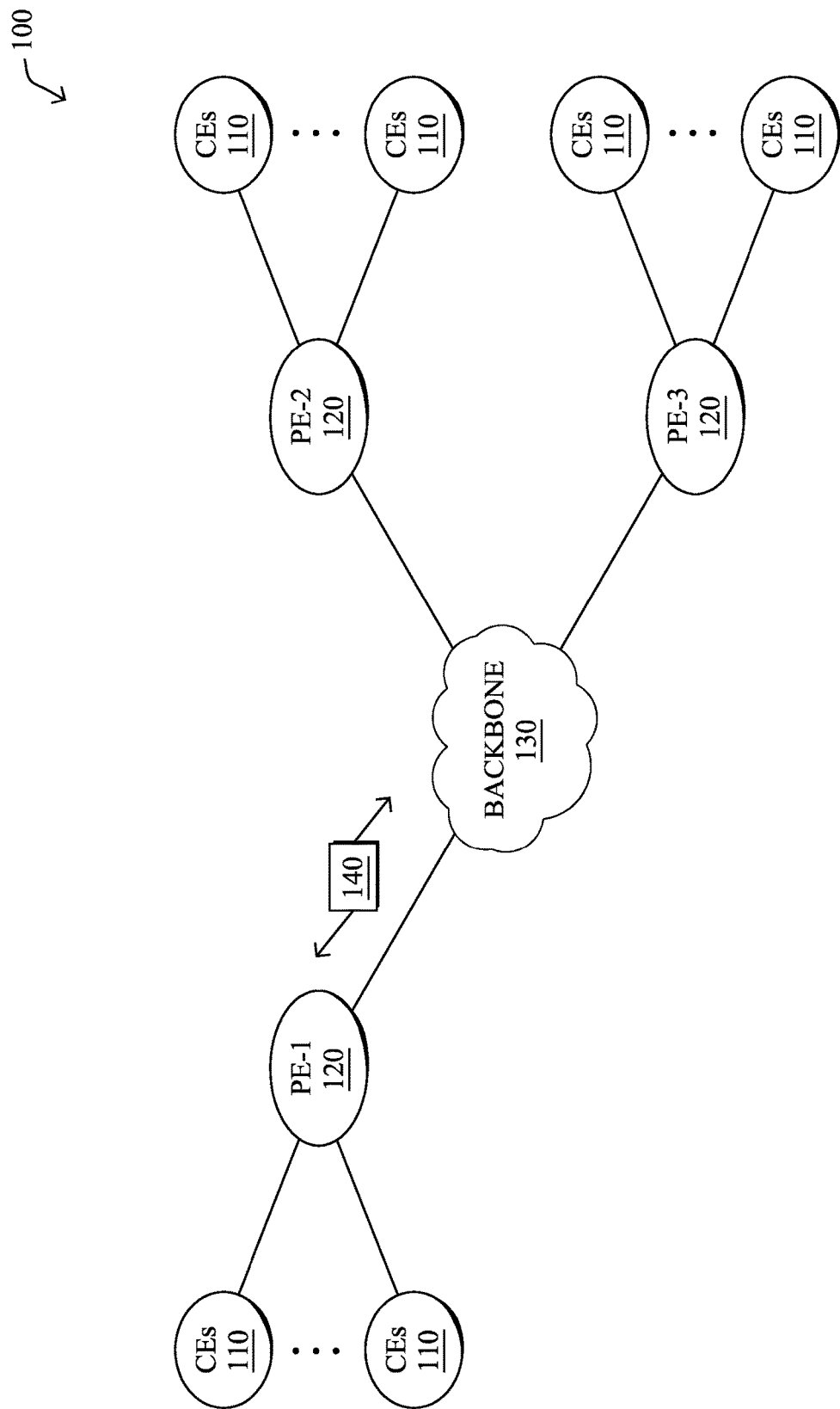
FIGS. 1A-1B illustrate an example communication network.

According to one or more implementations of the disclosure, a device receives an input request for a large language model-based network troubleshooting agent regarding an issue in a network. The large language model-based network troubleshooting agent performs a lookup of a recipe based on the input request, wherein the recipe comprises contextual information for the issue. The device generates, by the large language model-based network troubleshooting agent, a prompt for a large language model based on the input request and on the recipe. The device provides, by the large language model-based network troubleshooting agent, the prompt to the large language model to troubleshoot the issue in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
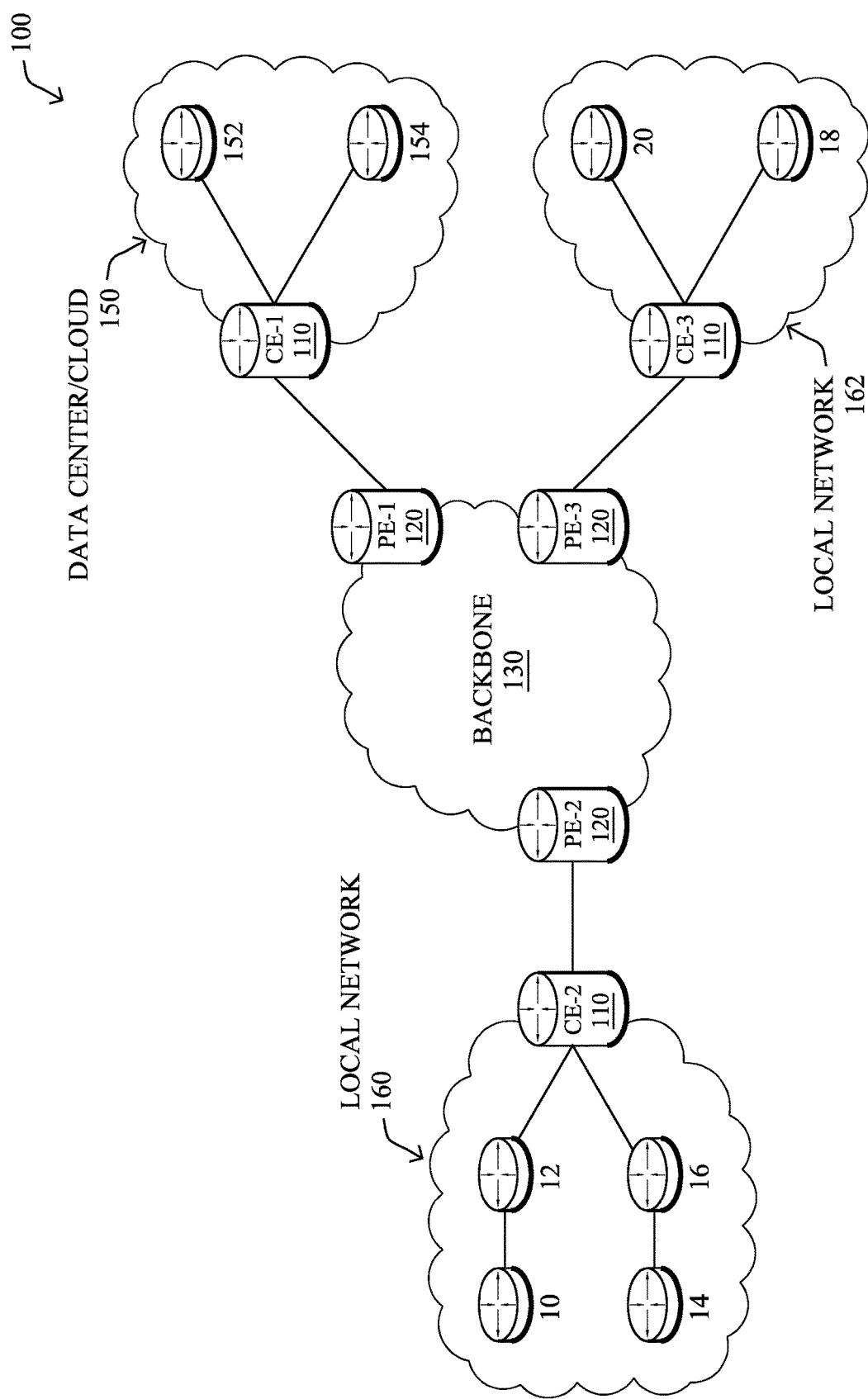

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
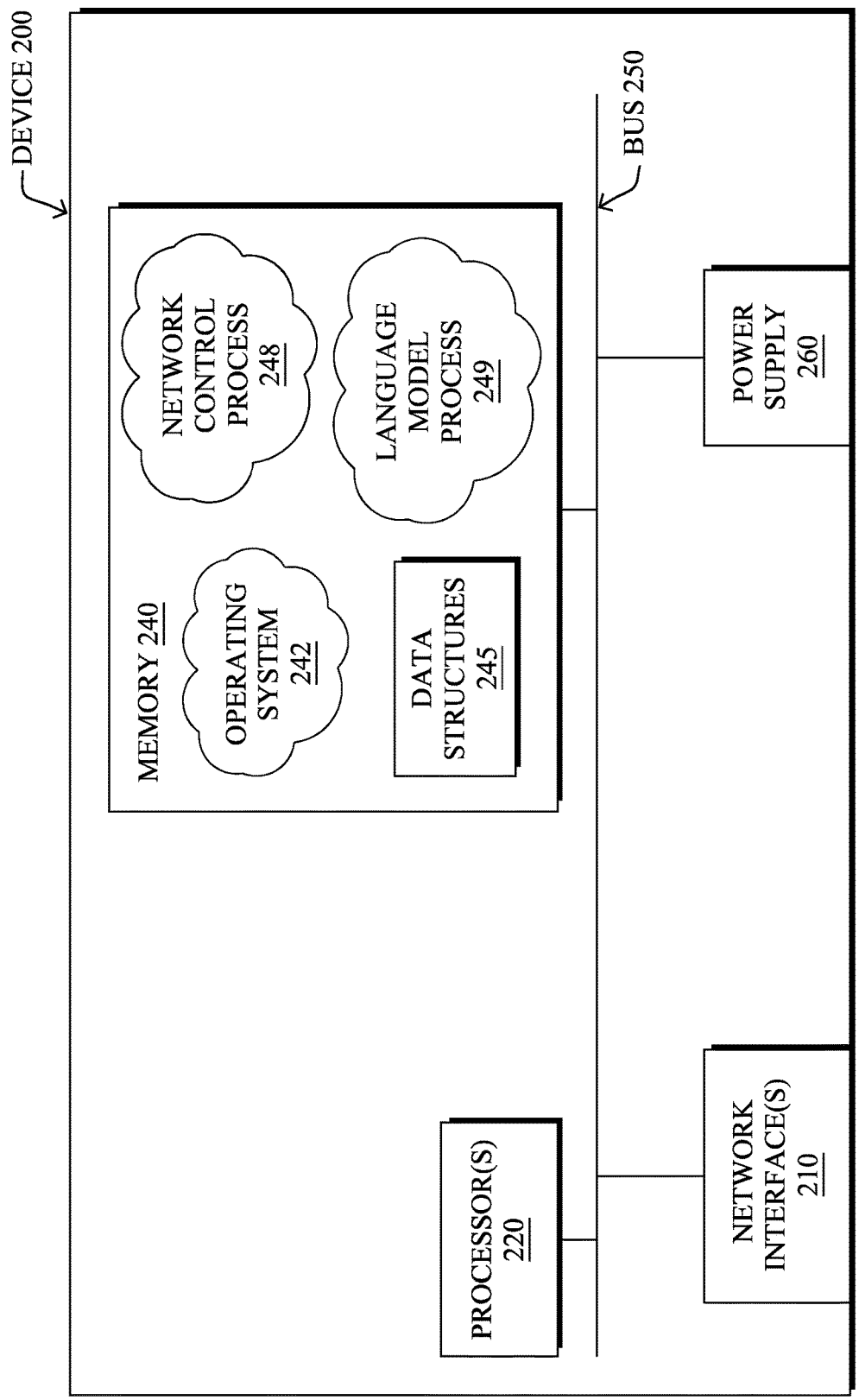
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
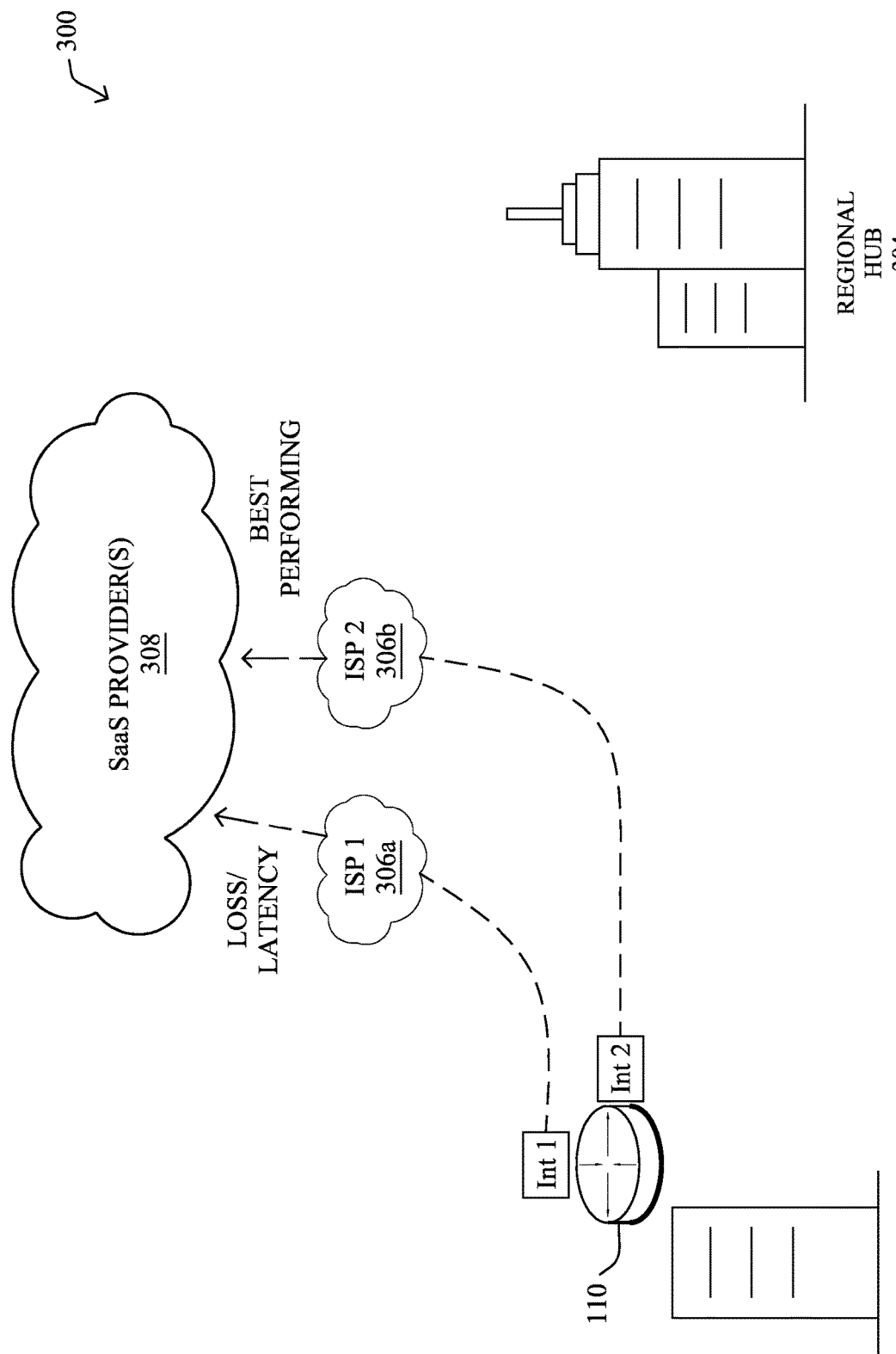
FIGS. 3A-3B illustrate example network deployments.
Figure 3B:
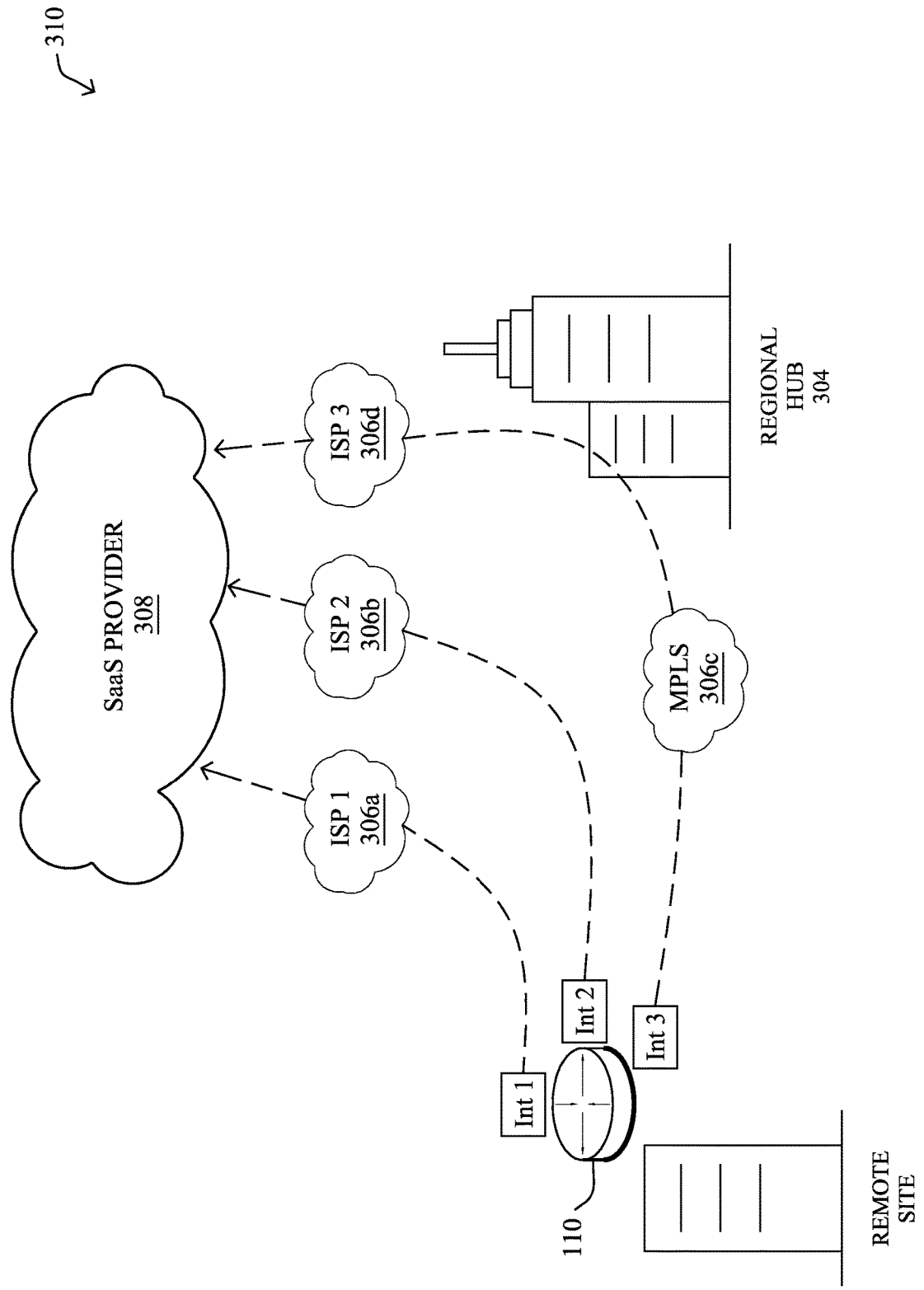

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
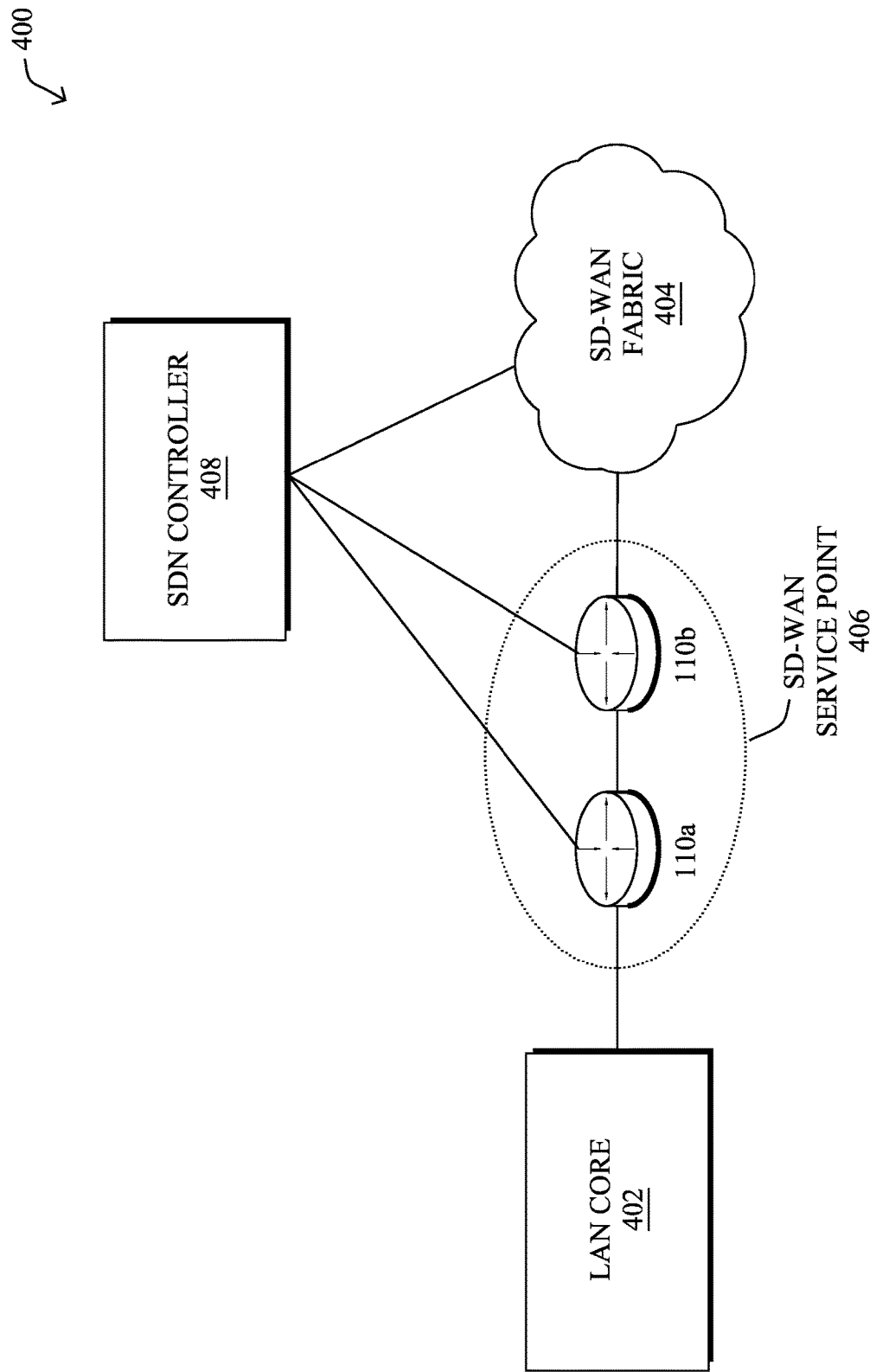
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

However, network troubleshooting is inherently complex, often requiring a combination of planning, reasoning, and logical deduction across multiple networking domains to effectively identify the root cause of an issue. Despite their impressive performance, even large models such as GPT-4 have been shown to struggle with successfully carrying out these types of multi-step tasks which are often required in the case of complex troubleshooting of routing protocols, wireless issues, or cross-domain problems.

Advanced prompting techniques such as few-shot prompting, which involves providing example prompts with questions and correct answers to help the model learn context and formulation simultaneously, and chain-of-thought (CoT) prompting, which guides models through intermediate logical steps, have been shown to enhance the performance of LLMs in multi-step tasks. However, they often fall short when dealing with complex network troubleshooting scenarios as, by themselves, they lack the ability to incorporate any specific domain or environment level knowledge or learnings based on previous experience into the decision-making process which is key to solving these types of tasks.

LLM-Based Network Troubleshooting Using
Expert-Curated Recipes

The techniques herein introduce a methodology for enhancing the ability of an LLM-based network troubleshooting agent to solve complex networking issues by the use of recipes, i.e., high-level instructions for troubleshooting an issue, as part of LLM prompts. These recipes can take a variety of forms from expert-written sketches of the steps that subject matter experts (SMEs) would take to solve a given problem to summaries (written by an expert or a model) of support cases/tickets or issue post-mortems to already existing knowledge graphs and/or rule bases (e.g., MRE).

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device receives an input request for a large language model-based network troubleshooting agent regarding an issue in a network. The large language model-based network troubleshooting agent performs a lookup of a recipe based on the input request, wherein the recipe comprises contextual information for the issue. The device generates, by the large language model-based network troubleshooting agent, a prompt for a large language model based on the input request and on the recipe. The device provides, by the large language model-based network troubleshooting agent, the prompt to the large language model to troubleshoot the issue in the network.

Figure 5:
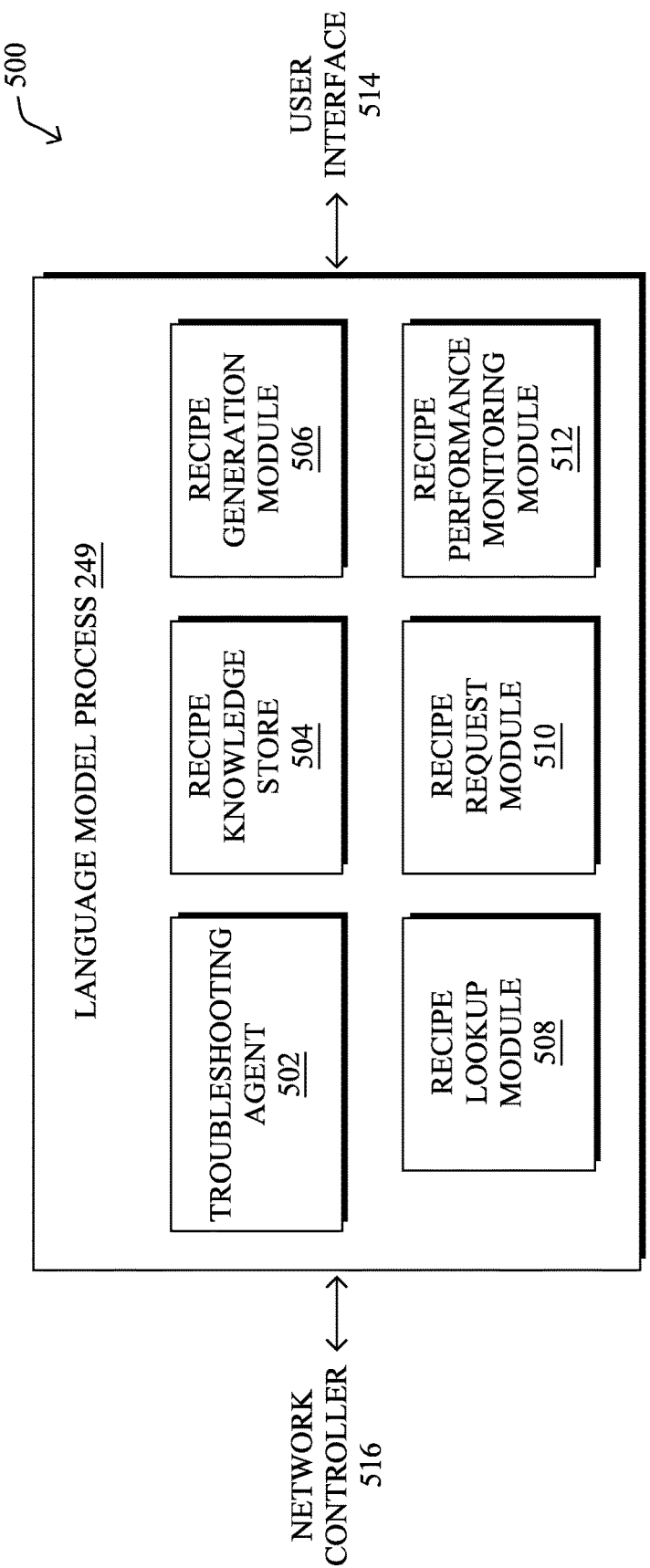
FIG. 5 illustrates an example architecture for large language model (LLM)-based network troubleshooting using expert-curated recipes.

Operationally, FIG. 5 illustrates an example architecture for large language model (LLM)-based network troubleshooting using expert-curated recipes, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 516, either locally or via a network, such as via one or more application programming interfaces (APIs), etc.

Figure 6:
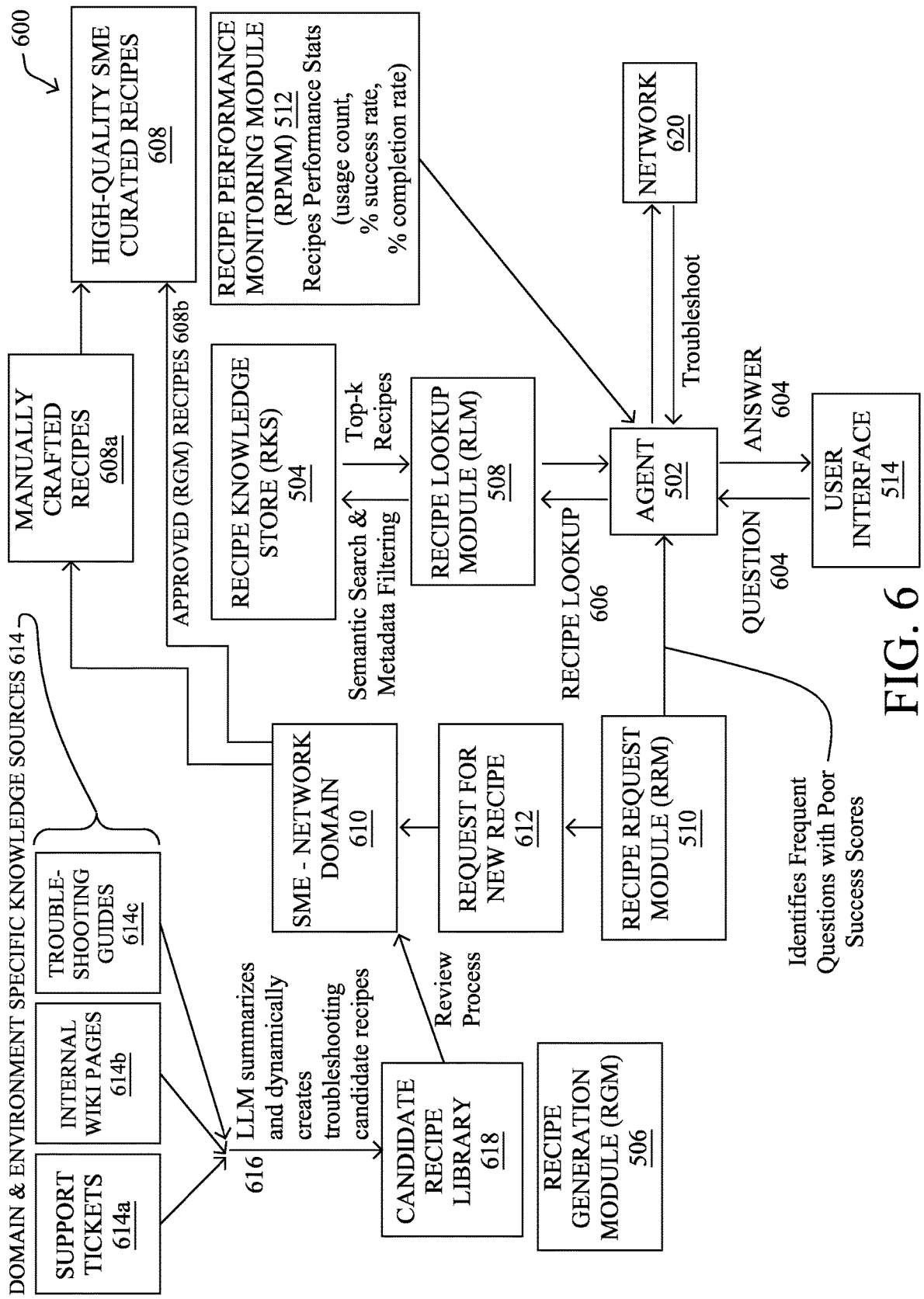
FIG. 6 illustrates an example of the interactions of the components of the architecture in FIG. 5.

As shown, language model process 249 may include any or all of the following components: a troubleshooting agent 502, a recipe knowledge store 504, a recipe generation module 506, a recipe lookup module 508, a recipe request module 510, and/or a recipe performance monitoring module 512. As would be appreciated, the functionalities of these components may be combined or omitted, as desired. In addition, these components may be implemented on a singular device or in a distributed manner, in which case the combination of executing devices can be viewed as their own singular device for purposes of executing language model process 249. FIG. 6 illustrates an example of the interactions of the components of architecture 500.

According to various implementations, troubleshooting agent 502 may leverage one or more LLMs to troubleshoot an issue, find the actual root cause for the issue, and/or suggest a set of one or more actions to fix the issue. Let ai denote an action used for troubleshooting an issue I and let Ai denote an action (configuration change) on the network (closed-loop control). In various instances, issue I may be raised by an end user, a set of users, or detected automatically within the network. For instance, as shown in example 600 in FIG. 6, assume that a user operating user interface 514 issues a question 602 indicative of an issue in network 620 (e.g., "why is my Internet connection slow?") to troubleshooting agent 502, which may then seek to troubleshoot the issue and either initiate corrective actions, automatically, or provide them to user operating user interface 514 as part of an answer 604.

The set of actions Ai required to solve the issue I may be determined on-the-fly by the LLM of troubleshooting agent 502, statically determined according to a cookbook for each trajectory made of a set of action ai, or the like. For example, a static cookbook may be used to map a specific ak to set of actions Ak,l. Consider the action ak="Check the priority queue length of a router," a static set of action ak,l may be used to trigger a set of l action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified by troubleshooting agent 502 for issue I is eligible for automated action (e.g., according to a policy), troubleshooting agent 502 may perform any or all of the following:
  Troubleshooting agent 502 retrieves the set of action Ai for the root cause of issue I after activating a timer T (max time to solve the issue)
  Troubleshooting agent 502 may also employ various optimization criterion may be used for solving a given task T. For instance, troubleshooting agent 502 may solve some tasks with objective metrics such as reducing the processing time or improve accuracy even at the risk of involving more steps and tokens (cost). In the context of the techniques herein, the issue criticality may also drive the optimization criteria (e.g., time versus reliability versus cost). In one implementation, the optimization criteria may be unique and decided according to policy and criticality. In another implementation, troubleshooting agent 502 may trigger multiple actions in parallel, each with different optimization criterion. For example, for a given issue I, troubleshooting agent 502 may send a request to a first LLM with a first criteria (e.g., solve as quickly as possible, optimizing time) and send the same request to a second LLM with different optimization criteria (e.g., efficiency). In such a case, troubleshooting agent 502 may use the reply to the first request (set of resolution action Ai) to quickly fix the network, followed by using the second set of actions to optimize the resolution of the issue. Note that both requests may not overlap in terms of closed-loop actions, as well.

As would be appreciated, while troubleshooting agent 502 may be capable of performing complex troubleshooting tasks and, in some instances, taking automated action to correct issues in the network, its general functionality may also include tasks such as simply monitoring the status or performance of the network, as well as performing configuration changes, even in the absence of an existing issue.

In various implementations, recipe knowledge store 504 serves as a central repository for storing recipes. In general, recipes are snippets of text containing high-level instructions for troubleshooting an issue which can be included as part of the planning prompts used by troubleshooting agent 502. Based on their scope, recipes can take on various forms such as any or all of the following:
  Planning recipes: This type of recipe can help troubleshooting agent 502 by describing the high-level steps required to troubleshoot a specific type of issue along with the API or software development kit (SDK) methods needed to retrieve the data required for each step, given the question. For example, one planning recipe may indicate the steps used to identify SLA violations on WAN circuits at an SD-WAN site.

Intermediate planning recipes: The focus of these recipes would be to help troubleshooting agent 502 in its intermediate planning. These recipes may be in the form of "insights" that pertain to how troubleshooting agent 502 can solve a particular task. For instance, one such recipe may include instruction on how to perform correlation between two time series with two different time granularities.

Debugging recipes: The focus of these recipes is to help troubleshooting agent 502 look up tips on resolving well-known exceptions that it might encounter. These can be retrieved whenever troubleshooting agent 502 encounters an exception in this execution. For instance, one such recipe may indicate how to handle no response from an API or SDK method. The recipe can provide steps and instructions on how to check for such issues and possible solutions.

Recipe knowledge store 504 may receive recipes from downstream components, detailed below, as text files or using another format, and transforms them to vector embeddings. In some cases, recipe knowledge store 504 may also include any relevant metadata fields associated with a recipe in its vector embedding, as well. In turn, recipe knowledge store 504 may store the vector embedding in a suitable vector database such as Chroma, Pinecone, or the like.

In one implementation, recipe knowledge store 504 may generate the embeddings using a SaaS service, such as the one provided by OpenAI, where the body of the recipe (as text) is sent via an API interface to a cloud service that returns the vector embedding. In another implementation, recipe knowledge store 504 can make use of one of the pre-trained open-source embedding models to generate the vector embeddings locally.

While some recipes may be manually created by SMEs, in the form of expert-written sketches of the steps they would take to solve a given problem, and submitted directly to recipe knowledge store 504, others may be created using more automated methods from existing data sources. Accordingly, recipe generation module 506 may be responsible for automatically and continuously generating new potential candidate recipes to be used by the system.

In one implementation, recipe generation module 506 may create recipes by interfacing with existing knowledge databases such as ticketing systems or internal document repositories. For example, after a support ticket concerning a technical issue is finalized, an LLM can be employed to summarize the problem statement and extract the troubleshooting steps performed by a human network engineer in a new recipe. Other sources of information such as troubleshooting documents, internal wiki pages, incident post-mortem reports often contain high-quality detailed information, in many cases even with examples of troubleshooting procedures that can be leveraged to create new recipes.

By way of example, FIG. 6 shows recipe generation module 506 leveraging an LLM 616 to populate a candidate recipe library 618 with candidate recipes based on existing knowledge sources 614, such as support tickets 614a, internal wiki pages 614b, and troubleshooting guides 614c. In turn, these candidate recipes may undergo a review process whereby an SME 610 may approve at least some of the recipes from recipe generation module 506 as approved recipes 608b for storage by recipe knowledge store 504 as part of its set of recipes 608.

Figure 7:
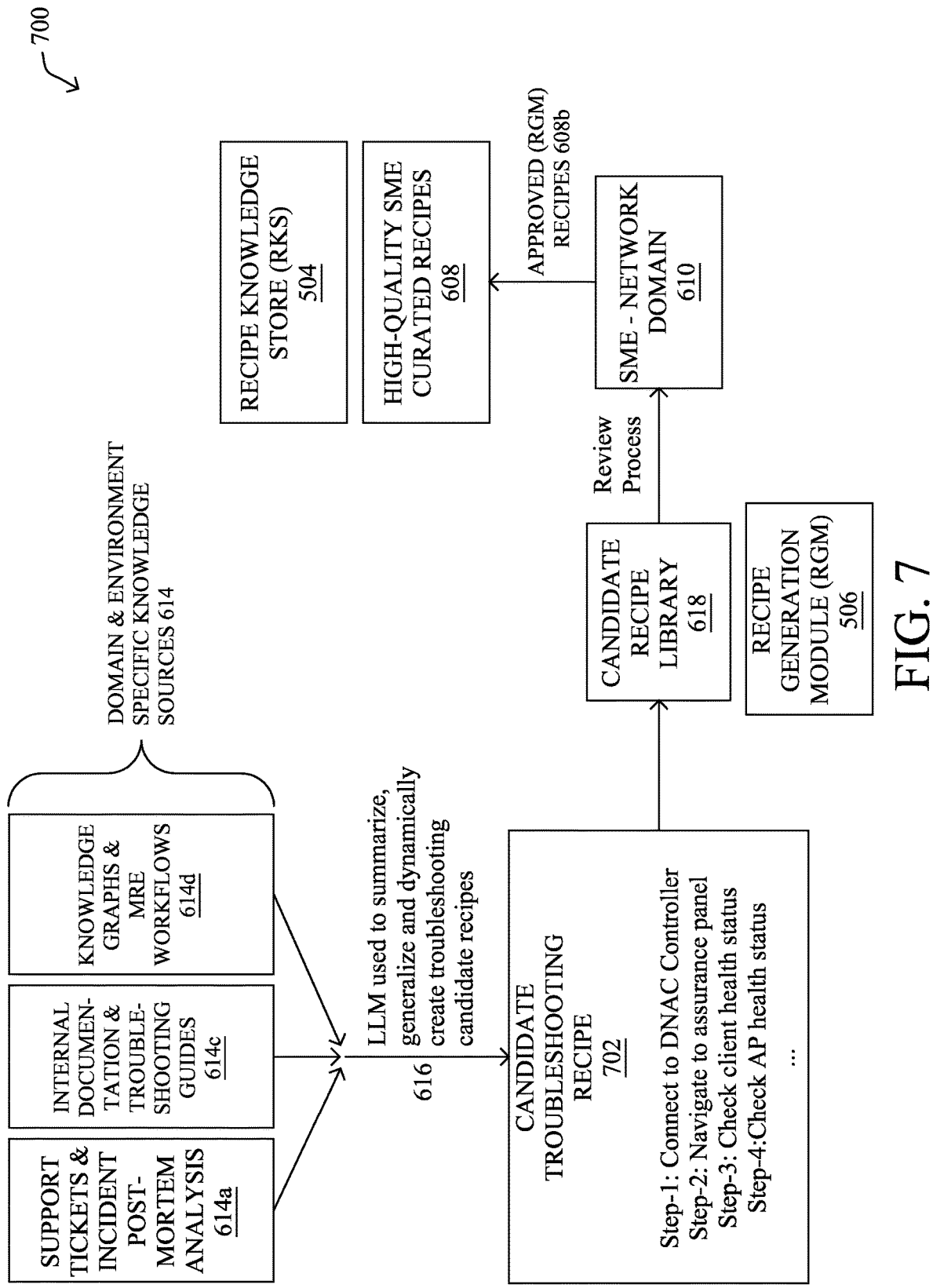
FIG. 7 illustrates an example of the generation of troubleshooting recipes from existing knowledge systems.

A more detailed example 700 of the generation of troubleshooting recipes from existing knowledge systems is shown in FIG. 7. As shown, assume that knowledge sources 614 includes support tickets 614a (which may also include post-incident analysis), troubleshooting guides 614c, knowledge graphs and MRE workflows 614d, or the like. In such cases, LLM 616 may assess any or all of these existing knowledge sources 614 to generate a candidate troubleshooting recipe 702. For instance, recipe 702 may include troubleshooting steps such as:
1. Connect to DNAC controller
2. Navigate to assurance panel
3. Check client health status
4. Check AP health status In turn, recipe generation module 506 may store recipe 702 in candidate recipe library 618. In turn, SME 610 may review recipe 702 and, if they approve of it, include it in approved recipes 608b for inclusion in its set of recipes 608 by recipe knowledge store 504.

In further instances, recipe generation module 506 may rely on a software agent running on the PC of network support engineers to inspect the troubleshooting actions taken when an engineer, administrator, or other SME faced with various types of network issues. Such an endpoint agent may take the form of a ThouandEyes endpoint agent or other such agent capable of monitoring user activity, creating detailed traces and store them (e.g., in a telemetry format, such as HAR). The agent records the various panels and statistics that were checked, commands that were run and actions that were taken to troubleshoot a specific issue. With the help of an LLM, the information in each step is generalized and recorded as a new candidate recipe.

Figure 8:
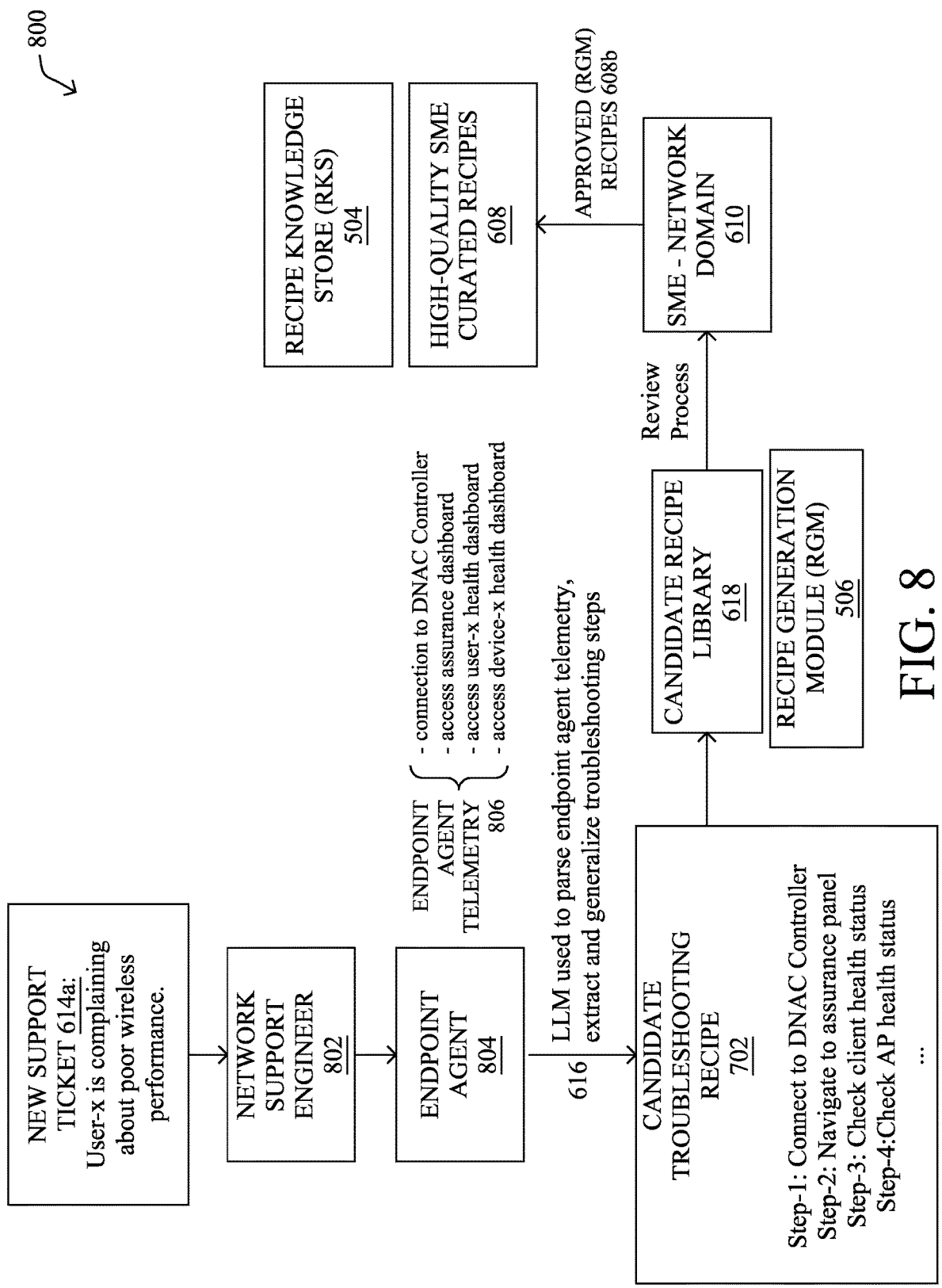
FIG. 8 illustrates an example of the generation of troubleshooting recipes by observing support engineers.

FIG. 8 illustrates an example 800 of the generation of troubleshooting recipes by observing support engineers addressing a given issue in a network. As shown, assume that a new support ticket 614a is issued with an end user complaining about poor wireless performance. In such a case, the network support engineer 802 may take a number of troubleshooting steps, which endpoint agent 804 may capture, thereby generating telemetry 806. For instance, assume that network support engineer 802 takes the same troubleshooting steps as above in FIG. 7. In turn, LLM 616 may analyze telemetry 806 to generate recipe 702 (assuming the same steps as in FIG. 7), which recipe generation module 506 then stores in candidate recipe library 618. In turn, SME 610 may review recipe 702, approve it as part of approved recipes 608b, and send them to recipe knowledge store 504 for storage in its set of recipes 608.

Referring again to FIGS. 5-6., regardless of the approach taken by recipe generation module 506, once it creates a new recipe, that recipe may be added to a queue of candidate recipes subject to human review, such as by SME 610 in FIG. 6. In various instances, the new recipe may be added to the queue for each new instance or when a given number of similar instances have been observed. Recipe generation module 506 may even decide to add a recipe if the number of similar instances that had been observed exceeds a specific threshold.

During the review process, an SME may also evaluate and potentially update the recipe steps prior to it being submitted to recipe knowledge store 504. To avoid redundant recipes, and to make the review process lighter, a clustering step could also be used to identify similar candidates and group them before presenting them to the SME for review.

To avoid overloading the SMEs responsible for renewing new recipes, recipe generation module 506 may incorporate additional logic that will allow it to perform a semantic search on the existing recipe database of recipe knowledge store 504 to determine if a similar recipe already exists. In such cases, recipe generation module 506 may choose to discard the candidate recipe.

In various implementations recipe lookup module 508 may be responsible for selecting the recipe corresponding to a particular troubleshooting question/issue to be addressed by troubleshooting agent 502. To do so, recipe lookup module 508 may perform a semantic search for each question against recipe knowledge store 504 and then select the most relevant recipe or set of recipes based on the similarity score. The best-identified recipe or recipes are then included in the prompt for the LLM of troubleshooting agent 502 along with the original question. More specifically, when a new issue is raised, troubleshooting agent 502 may send a recipe lookup request 606 to recipe lookup module 508 to find the most relevant troubleshooting recipe for that issue.

In addition to the semantic search, recipe lookup module 508 may also implement additional logic that allows it to filter recipes based on recipe metadata information. For example, statistics about the recipe success rate may be stored by recipe knowledge store 504 in the metadata fields along, as such recipe lookup module 508 may use this additional filtering as a tiebreaker in the case of recipes with close similarity scores.

Finally, recipe lookup module 508 may implement a minimum similarity score threshold, designed to avoid randomly picking a recipe when no good matches exist. In such cases, it is more beneficial to fall back to the general LLM model networking knowledge rather than instruct to perform a set of potentially irrelevant steps.

In yet another embodiment, recipe lookup module 508 may do some exploration and from time to time add a recipe with a lower similarity score; if successful such an exploration strategy should be reported to the designer/network administrator.

Recipe request module 510 may be operable to identify the troubleshooting questions where troubleshooting agent 502 is struggling and where new recipes might be beneficial to improve performance. To do so, recipe request module 510 may monitor the questions answered by troubleshooting agent 502 and identify frequent questions that could not be completed successfully (or were marked as failed by the user) and for which no recipe could be identified by recipe lookup module 508. In some implementations, recipe request module 510 may make use of an LLM to aggregate and generalize similar questions.

Finally, recipe request module 510 may send a recipe request 612 to SME 610, or a selected group of SMEs, for the creation of a new recipe. Recipe request module 510 may also use various criteria to select among the possible SMEs, as well. The role of recipe request module 510 can be particularly important as it can help guide where SME effort and time is spent so that the overall system performance is improved.

Recipe performance monitoring module 512 may have the role of tracking the performance metrics of each recipe. Various performance metrics can be tracked such as, but not limited to:

Usage count: number of times the recipe has been used.
Completion rate: % of times the agent was able to successfully follow the recipe and execute all steps.
Success rate: % of times the recipe resulted in identifying a root cause.

Recipes that are seldom used, may also be deprecated over time by recipe performance monitoring module 512 while recipes with low completion or success rates may be prompted to SMEs to be updated.

Finally, language model process 249 may provide various data to user interface 514. First it may allow a network administrator to inspect the system operation, performance metrics and perform any required configuration changes. Secondly, it provides an interface that can be used by SMEs to either directly submit new recipes to the system or review and update dynamically created recipes by recipe generation module 506. Finally, it may also leverage user operating user interface 514 to inform the system administrator or a collection of SMEs of the potential need for new recipes to be created.

Figure 9:
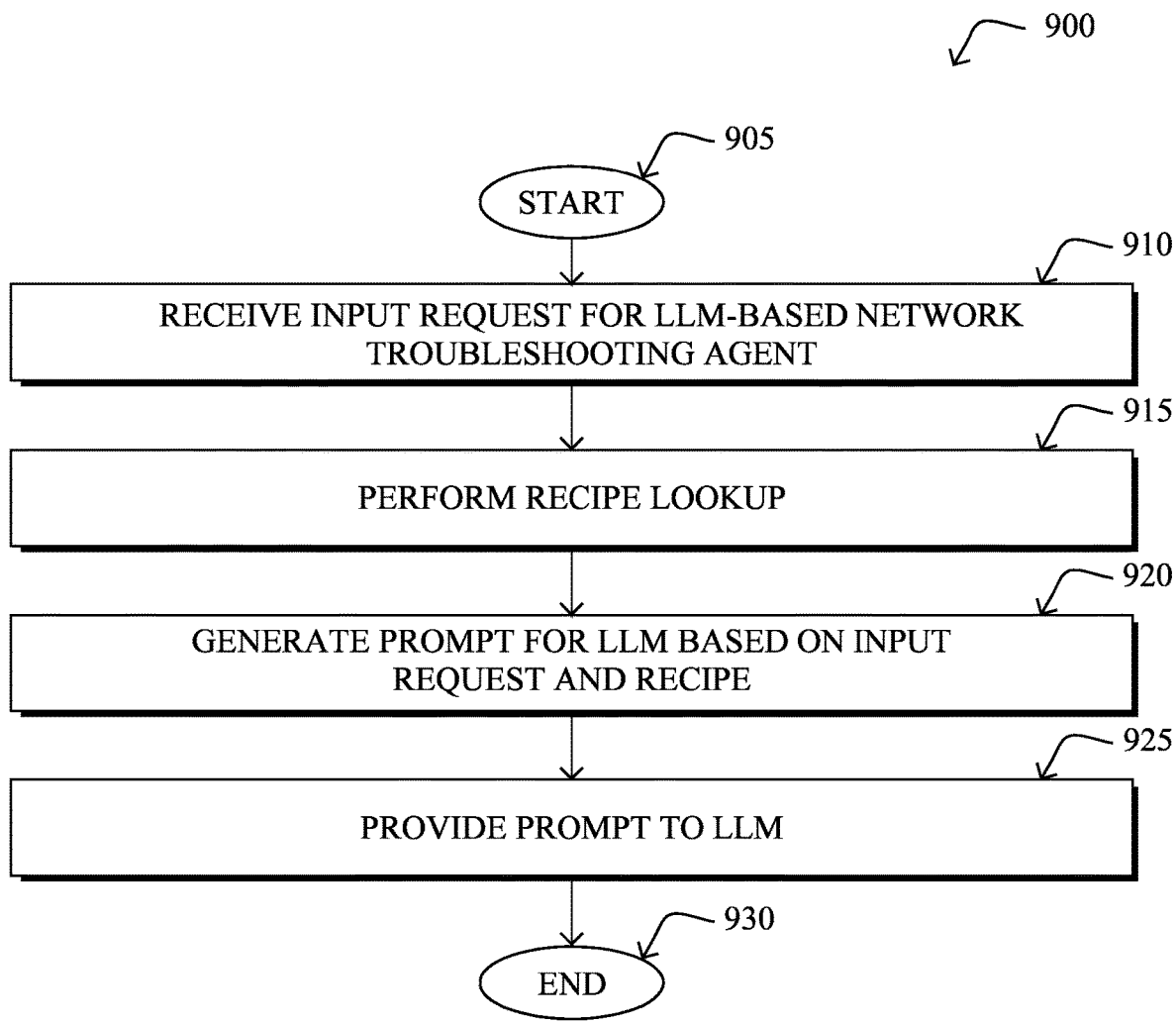
FIG. 9 illustrates an example simplified procedure for LLM-based network troubleshooting using expert-curated recipes.

FIG. 9 illustrates an example simplified procedure (e.g., a method) for large language model (LLM)-based network troubleshooting using expert-curated recipes, in accordance with one or more implementations described herein. For example, a non-generic, specifically configured device (e.g., device 200), such as a router, firewall, controller for a network (e.g., an SDN controller or other device in communication therewith), server, or the like, may perform procedure 900 by executing stored instructions (e.g., language model process 249 and/or network control process 248). The procedure 900 may start at step 905, and continues to step 910, where, as described in greater detail above, the device may receive an input request for an LLM-based network troubleshooting agent regarding an issue in a network.

At step 915, as detailed above, the LLM-based network troubleshooting agent may perform a lookup of a recipe based on the input request, wherein the recipe comprises contextual information for the issue. In some cases, the recipe is extracted from one or more of: a troubleshooting guide, a support ticket, a wiki page, or a post-mortem report. In one implementation, the device may also receive approval of the recipe by a subject matter expert. In another implementation, the recipe is based on information captured by an agent executed by an endpoint operated by a network support engineer.

At step 920, the device may generate, by the LLM-based network troubleshooting agent, a prompt for an LLM based on the input request and on the recipe, as described in greater detail above. In some implementations, the recipe is a planning recipe that indicates a set of troubleshooting steps associated with the issue. In various implementations, the recipe indicates an application programming interface (API) method or software development kit (SDK) method to perform a particular troubleshooting step. In one implementation, the recipe indicates how the LLM-based network troubleshooting agent should handle an exception.

At step 925, as detailed above, the device may provide, by the LLM-based network troubleshooting agent, the prompt to the LLM to troubleshoot the issue in the network. In some implementations, the LLM-based network troubleshooting agent may request creation of a new recipe based on the LLM-based network troubleshooting agent being unable to troubleshoot a particular issue in the network. In further implementations, the device may also provide performance metrics for the recipe to a user interface for display. For instance, the performance metrics may indicate a number of times the LLM-based network troubleshooting agent used the recipe, a percentage of times the LLM-based network troubleshooting agent was able to successfully complete the recipe, or a percentage of times the recipe was able to identify root causes of issues in the network.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for large language model (LLM)-based network troubleshooting using expert-curated recipes, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:
   receiving, at a device, an input request for a large language model-based network troubleshooting agent regarding an issue in a network, wherein the issue in the network is a networking issue in a communications network;
   performing, by the large language model-based network troubleshooting agent, a lookup of a recipe selected specifically based on the input request and the networking issue, wherein the recipe comprises contextual information for the issue and high-level expert-curated instructions for troubleshooting the networking issue;
   generating, by the large language model-based network troubleshooting agent, a prompt for a large language model based on the input request and on the recipe, wherein the recipe is provided as context to the large language model to guide generation of one or more troubleshooting actions specific to the networking issue; and
   providing, by the large language model-based network troubleshooting agent, the prompt to the large language model to troubleshoot the issue in the network.

2. The method as in claim 1, wherein the recipe is a planning recipe that indicates a set of troubleshooting steps associated with the issue.

3. The method as in claim 2, wherein the recipe indicates an application programming interface (API) method or software development kit (SDK) method to perform a particular troubleshooting step.

4. The method as in claim 1, wherein the recipe indicates how the large language model-based network troubleshooting agent should handle an exception.

5. The method as in claim 1, wherein the recipe is extracted from one or more of: a troubleshooting guide, a support ticket, a wiki page, or a post-mortem report.

6. The method as in claim 1, further comprising:
   receiving approval of the recipe by a subject matter expert.

7. The method as in claim 1, wherein the recipe is based on information captured by an agent executed by an endpoint operated by a network support engineer.

8. The method as in claim 1, further comprising:
   requesting, by the large language model-based network troubleshooting agent, creation of a new recipe based on the large language model-based network troubleshooting agent being unable to troubleshoot a particular issue in the network.

9. The method as in claim 1, further comprising:
   providing, by the device, performance metrics for the recipe to a user interface for display.

10. The method as in claim 9, wherein the performance metrics indicate a number of times the large language model-based network troubleshooting agent used the recipe, a percentage of times the large language model-based network troubleshooting agent was able to successfully complete the recipe, or a percentage of times the recipe was able to identify root causes of issues in the network.

11. An apparatus, comprising:
    one or more network interfaces;
    a processor coupled to the one or more network interfaces and configured to execute one or more processes; and
    a memory configured to store a process that is executable by the processor, the process when executed configured to:
    receive an input request for a large language model-based network troubleshooting agent regarding an issue in a network, wherein the issue in the network is a networking issue in a communications network;
    perform, by the large language model-based network troubleshooting agent, a lookup of a recipe selected specifically based on the input request and the networking issue, wherein the recipe comprises contextual information for the issue and high-level expert-curated instructions for troubleshooting the networking issue;
    generate, by the large language model-based network troubleshooting agent, a prompt for a large language model based on the input request and on the recipe, wherein the recipe is provided as context to the large language model to guide generation of one or more troubleshooting actions specific to the networking issue; and
    provide, by the large language model-based network troubleshooting agent, the prompt to the large language model to troubleshoot the issue in the network.

12. The apparatus as in claim 11, wherein the recipe is a planning recipe that indicates a set of troubleshooting steps associated with the issue.

13. The apparatus as in claim 12, wherein the recipe indicates an application programming interface (API)

method or software development kit (SDK) method to perform a particular troubleshooting step.

14. The apparatus as in claim 11, wherein the recipe indicates how the large language model-based network troubleshooting agent should handle an exception.

15. The apparatus as in claim 11, wherein the recipe is extracted from one or more of:
a troubleshooting guide, a support ticket, a wiki page, or a post-mortem report.

16. The apparatus as in claim 11, wherein the process when executed is further configured to:
receive approval of the recipe by a subject matter expert.

17. The apparatus as in claim 11, wherein the recipe is based on information captured by an agent executed by an endpoint operated by a network support engineer.

18. The apparatus as in claim 11, wherein the process when executed is further configured to:
request, by the large language model-based network troubleshooting agent, creation of a new recipe based on the large language model-based network troubleshooting agent being unable to troubleshoot a particular issue in the network.

19. The apparatus as in claim 11, wherein the process when executed is further configured to:
provide performance metrics for the recipe to a user interface for display.

20. A tangible, non-transitory, computer-readable medium storing program instructions that cause a device to execute a process comprising:
receiving, at the device, an input request for a large language model-based network troubleshooting agent regarding an issue in a network, wherein the issue in the network is a networking issue in a communications network;
performing, by the large language model-based network troubleshooting agent, a lookup of a recipe selected specifically based on the input request and the networking issue, wherein the recipe comprises contextual information for the issue and high-level expert-curated instructions for troubleshooting the networking issue;
generating, by the large language model-based network troubleshooting agent, a prompt for a large language model based on the input request and on the recipe, wherein the recipe is provided as context to the large language model to guide generation of one or more troubleshooting actions specific to the networking issue; and
providing, by the large language model-based network troubleshooting agent, the prompt to the large language model to troubleshoot the issue in the network.

* * * * *